US 12,462,376 B2

(12) United States Patent
Poenitz et al.

(10) Patent No.: US 12,462,376 B2
(45) Date of Patent: Nov. 4, 2025

(54) REFERENCE RECORDING CREATION FOR EMPTY WORKPIECE CARRIERS

(71) Applicant: TRUMPF Werkzeugmaschinen SE + Co. KG, Ditzingen (DE)

(72) Inventors: Willi Poenitz, Leonberg (DE); Marc Teschner, Stuttgart (DE); Korbinian Weiss, Korntal (DE)

(73) Assignee: TRUMPF WERKZEUGMASCHINEN SE+ CO. KG, Ditzingen (DE)

( * ) Notice: Subject to any disclaimer, the term of this patent is extended or adjusted under 35 U.S.C. 154(b) by 323 days.

(21) Appl. No.: 18/322,608

(22) Filed: May 24, 2023

(65) Prior Publication Data

US 2023/0298161 A1 Sep. 21, 2023

Related U.S. Application Data

(63) Continuation of application No. PCT/EP2021/083619, filed on Nov. 30, 2021.

(30) Foreign Application Priority Data

Dec. 2, 2020 (DE) ..................... 10 2020 215 227.6

(51) Int. Cl.
*G06T 7/00* (2017.01)
*G06T 7/12* (2017.01)
*G06T 7/194* (2017.01)
*G06V 10/82* (2022.01)

(52) U.S. Cl.
CPC ................ *G06T 7/001* (2013.01); *G06T 7/12* (2017.01); *G06T 7/194* (2017.01); *G06V 10/82* (2022.01); *G06T 2207/30136* (2013.01); *G06T 2207/30164* (2013.01); *G06V 2201/06* (2022.01)

(58) Field of Classification Search
CPC ........... G06T 7/001; G06T 7/12; G06T 7/194; G06T 2207/30136; G06T 2207/30164; G06V 10/82; G06V 2201/06; G06V 10/25
See application file for complete search history.

(56) References Cited

U.S. PATENT DOCUMENTS

| 6,052,627 A | 4/2000 | Nakamura |
| 2016/0184945 A1 | 6/2016 | Saitou |
| 2019/0054587 A1 | 2/2019 | Wahrén |
| 2019/0240703 A1* | 8/2019 | Kiefer ................ G05B 19/4183 |
| 2019/0243343 A1* | 8/2019 | Kiefer ...................... B23Q 7/12 |
| 2020/0134829 A1* | 4/2020 | Flanagan ................ G06T 7/174 |

(Continued)

FOREIGN PATENT DOCUMENTS

| CN | 111571603 A | 8/2020 |
| DE | 202007002483 U1 | 5/2007 |

(Continued)

*Primary Examiner* — Iriana Cruz
(74) *Attorney, Agent, or Firm* — Leydig, Voit & Mayer, Ltd.

(57) ABSTRACT

A method creates a reference recording of the unloaded state of a workpiece carrier. The method includes: A) creating a recording of the workpiece carrier with a camera; B) determining a loading state of the workpiece carrier by evaluating the recording by an algorithm; and C) storing the recording as a reference recording in a case where the workpiece carrier is determined as being unloaded by the algorithm.

13 Claims, 3 Drawing Sheets

(56) References Cited

U.S. PATENT DOCUMENTS

| | | | |
|---|---|---|---|
| 2020/0142387 A1* | 5/2020 | Wahrén | G05B 19/4185 |
| 2021/0035283 A1 | 2/2021 | Oda | |
| 2021/0229308 A1 | 7/2021 | Ottnad et al. | |
| 2021/0308787 A1 | 10/2021 | Kiefer et al. | |
| 2022/0051014 A1* | 2/2022 | Tsai | G06T 7/0008 |
| 2022/0383618 A1* | 12/2022 | Nalam Venkat | G06V 10/82 |
| 2023/0210481 A1* | 7/2023 | Jeong | A61B 6/583 |
| | | | 378/62 |

FOREIGN PATENT DOCUMENTS

| | | |
|---|---|---|
| DE | 102015219369 A1 | 4/2017 |
| DE | 102018126077 A1 | 4/2020 |
| JP | 2011121740 A | 6/2011 |
| JP | 2019507079 A | 3/2019 |
| JP | 2020524647 A | 8/2020 |
| JP | 2021026276 A | 2/2021 |
| WO | WO 2018073419 A1 | 4/2018 |
| WO | WO 2020127797 A1 | 6/2020 |

* cited by examiner

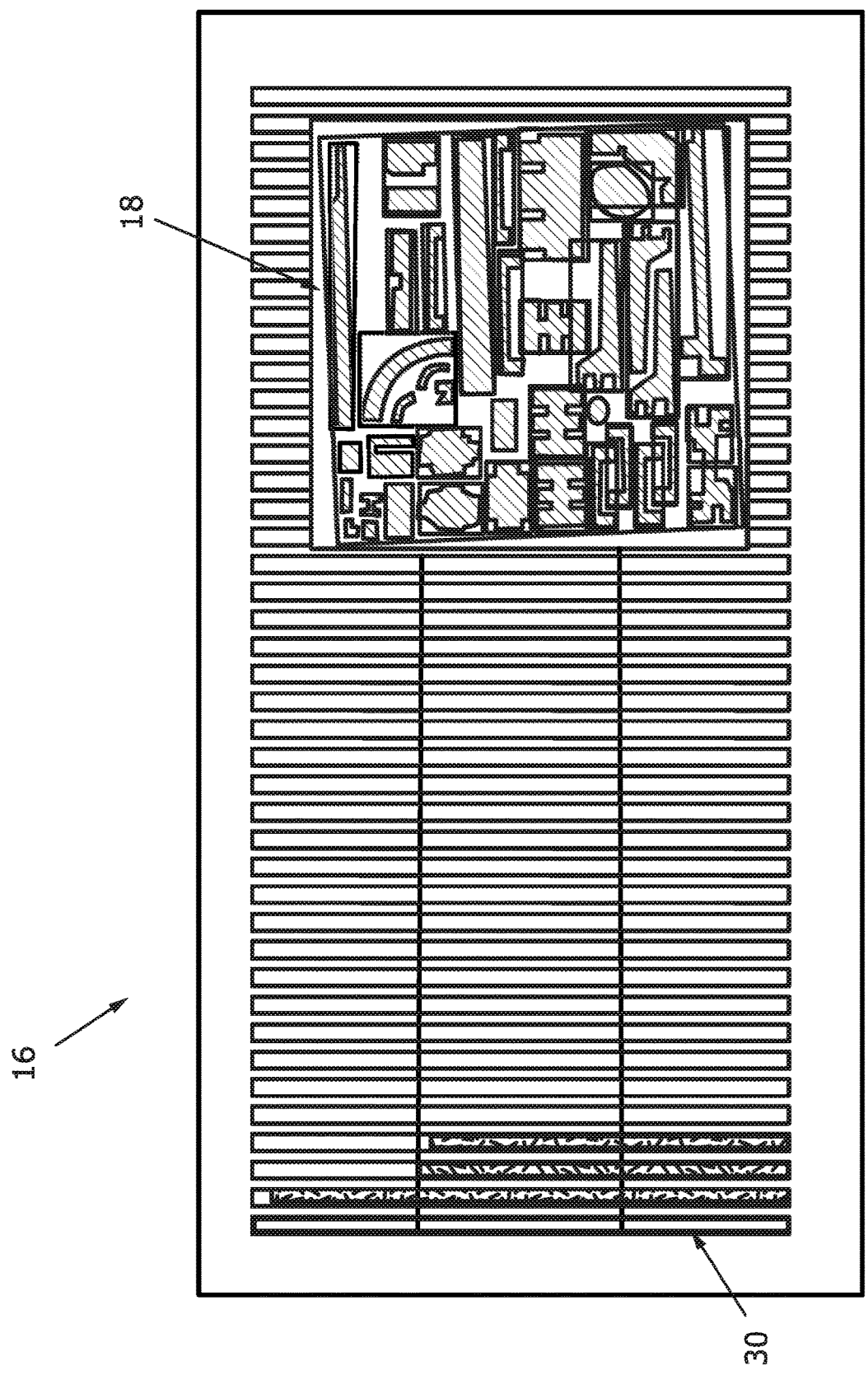

REFERENCE RECORDING CREATION FOR EMPTY WORKPIECE CARRIERS

CROSS REFERENCE TO RELATED APPLICATIONS

This application is a continuation of International Application No. PCT/EP2021/083619 (WO 2022/117581 A1), filed on Nov. 30, 2021, and claims benefit to German Patent Application No. DE 10 2020 215 227.6, filed on Dec. 2, 2020. The aforementioned applications are hereby incorporated by reference herein.

FIELD

The present disclosure relates to a method for creating a reference recording of the unloaded state of a workpiece carrier. The present disclosure furthermore relates to a device for carrying out such a method.

BACKGROUND

Workpieces may be removed from workpiece carriers, and a program that monitors the removal of the workpieces may be used when doing so.

WO 2020/127797 A1 describes assisting a user in manually sorting manufactured parts from a workpiece carrier in the form of a pallet. Existing program data and image data recorded with a camera are used here to achieve reliable identification and registration of removed parts.

The problem here is identifying when the workpiece carrier is free of workpieces, that is to say completely sorted, since the workpiece carrier changes due to contamination and/or wear and tear.

US 2016/0184945 A1 has disclosed detecting contamination by way of using a camera to either detect a colour that lies outside specified colour ranges or by way of comparison with an image from a new pallet, that is to say the original pallet. In addition to the camera, a weight sensor can be provided in order to detect contamination based on the (additional) weight of the contamination.

However, the present inventors have recognized that this method could be improved since, as previously mentioned, the pallet changes due to wear and tear and/or contamination. Therefore, the situation may occur in the prior art of a workpiece carrier being identified as not completely sorted even though there are no longer any workpieces on the workpiece carrier but contamination is detected below the workpiece carrier and/or wear and tear on the workpiece carrier gives the impression that the workpiece carrier is loaded.

SUMMARY

In an embodiment, the present disclosure provides a method that creates a reference recording of the unloaded state of a workpiece carrier. The method includes: A) creating a recording of the workpiece carrier with a camera; B) determining a loading state of the workpiece carrier by evaluating the recording by an algorithm; and C) storing the recording as a reference recording in a case where the workpiece carrier is determined as being unloaded by the algorithm.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 shows a plan view of the workpiece carrier according to FIG. 1 in a different loading state;

FIG. 4b shows a plan view of an evaluation of the workpiece carrier from FIG. 4a.

DETAILED DESCRIPTION

Figure 1:
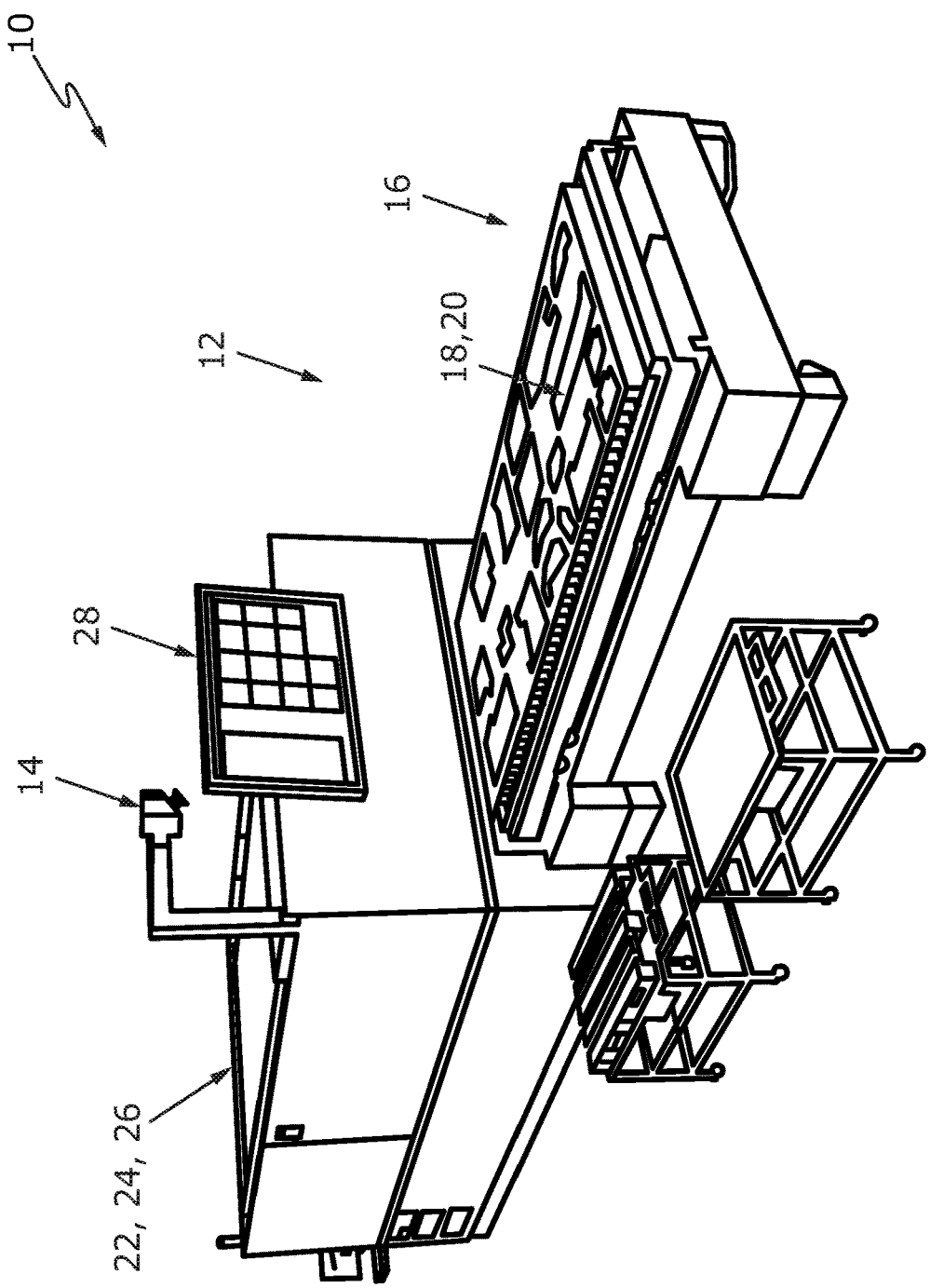
FIG. 1 shows a perspective view of a device according to an aspect of the present disclosure for carrying out a method according an aspect of the present disclosure, wherein the device has a loaded workpiece carrier.

Aspects of the present disclosure provide a method and a device that enable reliable identification of a workpiece carrier that is free of workpieces.

According to an aspect of the present disclosure, a method is proved comprising the method steps of:

A) recording a workpiece carrier with a camera;
B) identifying the workpiece carrier state by an algorithm, the algorithm evaluating the recording of the workpiece carrier;
C) storing the recording as a reference recording if the algorithm has identified the workpiece carrier as being free of workpieces.

In contrast to the prior art, the current state of the workpiece carrier does not have to be compared with the state of a new, unused workpiece carrier, but rather with the state of the workpiece carrier when it was last unloaded. As a result, the loading state of the workpiece carrier can be determined significantly more reliably.

Method step A) is executed by the camera, and method steps B) and C) are preferably executed by a computer, which is connected to the camera and has a memory.

The recording can be created using ultraviolet and/or infrared light. The recording is preferably created using light in the visible range.

The method is preferably restarted if the workpiece carrier is identified as being loaded in method step B). The method can in particular be carried out continuously, so that a recording of the last unloaded workpiece carrier is continuously stored as a reference recording.

The algorithm is designed to distinguish between whether an object in the recording is an article which characterizes the workpiece carrier as not being unloaded or whether it is an image area to be ignored. An image area is to be ignored, for example, in the case of contamination, a change in the workpiece carrier or in the case of there being an article under the workpiece carrier. The algorithm can be designed to ignore or reject a detected object if its size and/or its position does not meet previously defined criteria.

Predefined criteria can be in the form of the width of the object (is the object too narrow for an article on the workpiece carrier?) or in the form of its proximity to the edge of the workpiece carrier (is the object too close to the edge of the workpiece carrier for an article?).

The size and/or the position of the object is preferably identified by a maximally stable extremal regions (MSER) algorithm. The MSER algorithm is preferably taken from an Open Computer Vision (OpenCV) library. As a result, the size and/or position of the object can be identified in a particularly process-stable manner.

In a particularly preferred refinement of the present disclosure, the algorithm is designed to identify whether an object is located above or below bars of the workpiece carrier. If the object is above the bars, it is taken into account; if it is below, it is ignored.

Here, the algorithm can be designed to identify whether an object is only visible between a plurality of bars. In this case, it has to be below the bars, so that this object does not characterize the workpiece carrier as being loaded.

The algorithm can carry out the following method steps in order to identify the bars:
  b) creating an edge image from gradients in a first direction (for example X-direction) and a second direction (for example Y-direction) which runs perpendicular to the first direction;
  c) dividing the recording into sectors;
  d) calculating the average pixel value within a rectangle shifted in the first direction (convolution) in the sectors;
  e) defining bar segments from maxima that are more than a defined distance from the nearest minimum in the second direction;
  f) defining bars if a predefined portion (for example more than 80%) of the bar elements lies within a range limit.

This enables process-reliable detection of the bars of the workpiece carrier.

The following method step is preferably carried out before method step b):
  a) carrying out histogram equalization.

This results in a more even distribution of the grey values, so that the entire available range of values can be used.

The following method step can be carried out after method step f):
  g) determining bar removal if there is a distance between two bars that is significantly greater than the distance between the other bars.

As a result, the state of the workpiece carrier can be characterized in a particularly precise and comprehensible manner. In addition, the (easily verifiable) information can be output to a user that a bar of the workpiece carrier is missing.

In a further preferred refinement of the present disclosure, the algorithm has a neural network. The neural network can comprise a multiplicity of weighted data aggregation routines.

In the case of a multiplicity of reference recordings, which show workpiece carriers correctly identified as being unloaded, the neural network can be trained to reliably identify the unloaded state of the workpiece carrier.

In the present method, the neural network can be trained using reference recordings, which were generated by method steps described here. In other words, the neural network can be trained using reference recordings, which were generated and stored using the method steps described above. In this case, the neural network can replace one or more method steps of the algorithm that are described here.

In the method according to the present disclosure, a workpiece carrier in the form of a machine bed of a machine tool, in particular a laser cutting machine, is preferably used.

An aspect of the present disclosure further provides a device for carrying out a method described here, wherein the device has a workpiece carrier, a camera, a computer which is connected to the camera, and a memory, wherein the algorithm can be executed on the computer and the reference recording is stored in the memory.

The device preferably has a machine tool, wherein a machine bed of the machine tool ("pallet") is designed in the form of the workpiece carrier.

The machine tool is particularly preferably designed in the form of a laser cutting machine.

Further advantages of the present disclosure are evident from the description and the drawings. Similarly, according to the present disclosure, the features mentioned above and those yet to be explained further can be used in each case individually or together in any desired combinations. The embodiments shown and described should not be understood as an exhaustive list, but rather are of an exemplary character for outlining the invention.

FIG. 1 shows a device 10 with a machine tool 12. The machine tool 12 is designed in the form of a laser cutting machine. The device 10 has a camera 14. The camera 14 can be designed to record moving images (videos) and/or photographs. The camera 14 creates recordings of a workpiece carrier 16, in particular from the bird's eye view.

The workpiece carrier 16 is designed in the form of a machine bed of the machine tool 12. A workpiece 18 can be placed on the workpiece carrier 16. In this case, the workpiece carrier 16 is loaded. In the present case, the workpiece 18 is part of a metal sheet 20, which can be machined in the machine tool 12.

The device 10 has a computer 22, in particular in the form of an industrial PC. The computer 22 has a memory 24. As an alternative or in addition, the computer 22 and/or the memory 24 can be provided externally, for example in a cloud. The computer 22 is connected to the camera 14. An algorithm 26 is stored in the computer 22. The algorithm 26 is executed in order to evaluate recordings recorded by the camera 14. The computer 22 can be connected to a display 28, here in the form of a monitor, in order to display which workpieces 18 have already been removed from the workpiece carrier 16.

In order to monitor the manufacturing process, it is important to know when the workpiece carrier 16 is unloaded, that is to say empty. However, identifying this is not trivial since the workpiece carrier 16 and its surroundings change over time. For example, the workpiece carrier 16 can wear out and/or become covered with slag over time. Chips and the like can accumulate under the workpiece carrier 16.

FIG. 2 shows this as an example. FIG. 2 shows a workpiece carrier 16 on which a workpiece 18 lies. This workpiece 18 leads to loading of the workpiece carrier 16. However, FIG. 2 also shows an interfering object 30. This interfering object 30 (here in the form of an article lying under the workpiece carrier 16) must not result in the workpiece carrier 16 being regarded as being loaded.

Figure 3:
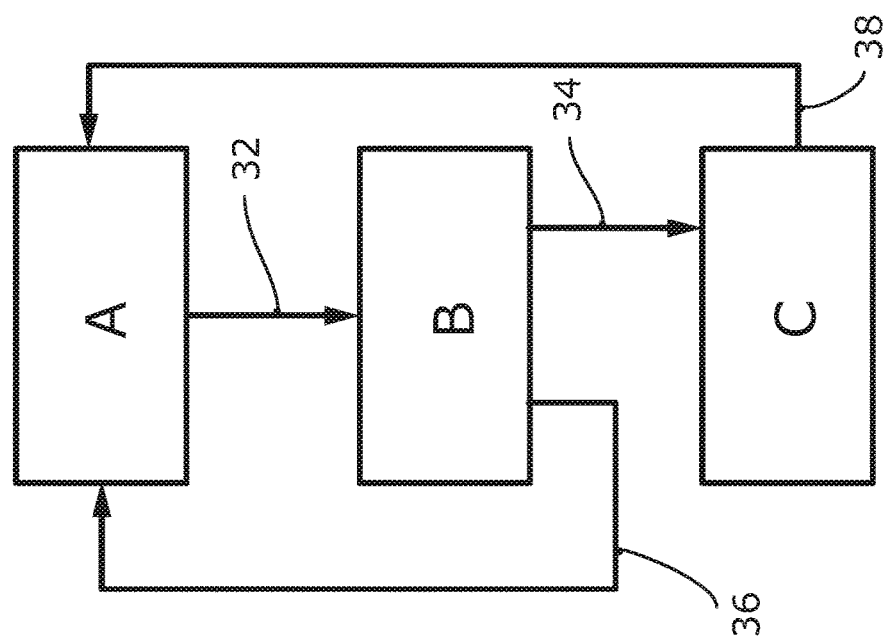
FIG. 3 schematically shows how the method according to an aspect of the present disclosure is carried out.

FIG. 3 schematically shows the method according to an aspect of the present disclosure, which facilitates the assessment of the loading state of the workpiece carrier 16 (see FIG. 2). The following method steps are executed here:
  A) creating a recording of the workpiece carrier 16 (see FIG. 2) with the camera 14 (see FIG. 1);
  B) then (arrow 32) deciding whether the workpiece carrier 16 (see FIG. 2) is empty (or not) by the algorithm 26 (see FIG. 1) based on the recording;
  C) storing the recording as a reference recording if the workpiece carrier 16 (see FIG. 2) is regarded as being empty by the algorithm 26 (see FIG. 1) (arrow 34) and repeating the method starting from method step A) if the workpiece carrier 16 (see FIG. 2) is regarded as not being empty by the algorithm 26 (see FIG. 1) (arrow 36).

The method can be carried out continuously (arrow 38), so that there is always a current reference image of the empty workpiece carrier 16 (see FIG. 2), which current reference image can be used in order to determine the current loading state of the workpiece carrier 16 (see FIG. 2).

The algorithm 26 (see FIG. 1) is therefore designed to distinguish between whether a workpiece 18 (see FIG. 2) is located on the workpiece carrier 16 or whether an object is an interfering object 30 (see FIG. 2). For this purpose, the algorithm 26 (see FIG. 1) can have a maximally stable extremal regions (MSER) algorithm, which is designed in particular to assess whether an object is too close to the edge of the workpiece carrier 16 with respect to a predefined distance (see FIG. 2) or whether it is too narrow with respect to a predefined size. In the case of the exemplary interfering object 30 in FIG. 2, both criteria are met, that is to say it is both close to the edge of the workpiece carrier 16 and is too narrow for a workpiece 18. The algorithm 26 (see FIG. 1) will therefore only classify the workpiece 18 as such, but not the interfering object 30. As soon as the workpiece 18 is removed, a recording of the workpiece carrier 16 is stored as a new reference recording.

Figure 4A:
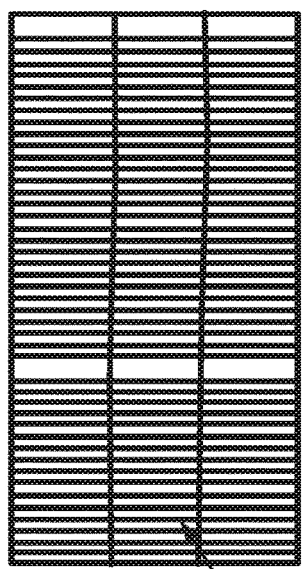
FIG. 4a shows a plan view of a workpiece carrier whose bars are intended to be identified.
Figure 4B:
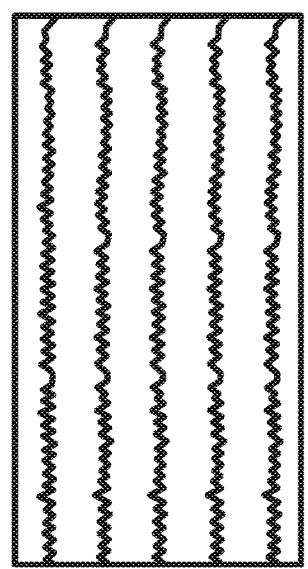
Figure 4C:
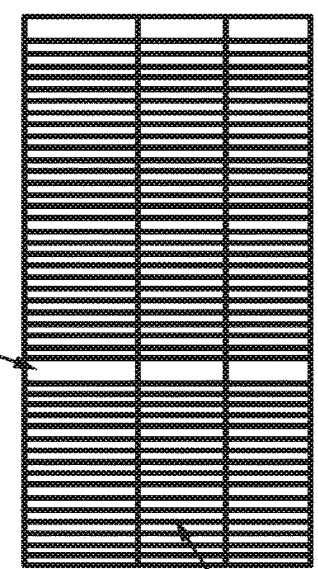
FIG. 4c shows a plan view of the workpiece carrier from FIG. 4a with identified bars.

FIGS. 4a to 4c illustrate the manner of operation of another part of the algorithm 26 (see FIG. 1), specifically identifying bars.

FIG. 4a shows a workpiece carrier 16 with several (supporting) bars 40. Histogram equalization is carried out on the recording and then an edge image is created from gradients in a first direction (here the X-direction) and in a second direction (here the Y-direction).

FIG. 4b shows the division of the recording of the workpiece carrier 16 into n sectors. The average pixel value within a rectangle which is shifted in the first direction is calculated for each sector.

Maxima that are more than a defined distance from the nearest minimum in the second direction are defined as bar segments. If a certain percentage of the bar elements lies within a specified range limit, a bar is detected.

FIG. 4c shows the recording of the workpiece carrier 16 with the detected bars 40. If there is too great a distance between two bars 40, bar removal 42 is detected.

Viewing all the figures of the drawing together, the present disclosure relates to a method for storing a current reference image of an unloaded workpiece carrier 16. In a method step A) of the method, a recording of the workpiece carrier 16 is first created, in a method step B) the recording is assessed by an algorithm 26 and in a method step C) the recording is stored as a reference recording if the algorithm 26 classifies the workpiece carrier 16 as being empty. In order to assess the workpiece carrier 16, the algorithm 26 can have a maximally stable extremal regions algorithm, an algorithm for identifying bars 40 of the workpiece carrier 16 and/or a neural network. The present disclosure furthermore relates to a device 10 for carrying out such a method.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Device
12 Machine tool
14 Camera
16 Workpiece carrier
18 Workpiece
20 Metal sheet
22 Computer
24 Memory
26 Algorithm
28 Display
30 Interfering object
32 Arrow
34 Arrow
36 Arrow
38 Arrow
40 Bars
42 Bar removal
A-C Method steps

The invention claimed is:

1. A method for creating a reference recording of an unloaded state of a workpiece carrier, the method comprising:
  A) creating a recording of the workpiece carrier with a camera;
  B) determining, using a computer, a loading state of the workpiece carrier by:
    evaluating the recording, by executing an algorithm on the computer, to determine whether an object is present on the workpiece carrier; and
    upon determining that the object is present, determining, by executing the algorithm on the computer, whether a dimension of the object is narrower than a predefined size or a position of the object is closer to an edge of the workpiece carrier than a predefined distance, determining that the object is not on the workpiece carrier; and
  C) upon determining that the workpiece carrier is unloaded based on determining that no object is present on the workpiece carrier, storing the recording in a memory as a reference recording for a next determination of the loading state of the workpiece carrier.

2. The method according to claim 1, wherein at least the method steps A) and B) are carried out again based upon the workpiece carrier being determined as being loaded by the algorithm.

3. The method according to claim 1, wherein the algorithm comprises a maximally stable extremal regions algorithm, which detects the dimension or the position of the object.

4. The method according to claim 1, wherein the algorithm comprises a neural network which identifies the unloaded state of the workpiece carrier.

5. The method according to claim 4, wherein the neural network is trained using reference recordings which were stored in prior operation of the method.

6. A device for carrying out the method according to claim 1, wherein the device comprises a workpiece carrier; a camera; and a computer which is connected to the camera and has a memory, wherein the algorithm is configured to be executed on the computer and the reference recording is configured to be stored in the memory.

7. The device according to claim 6, wherein the device further comprises a machine tool, wherein a machine bed of the machine tool is designed in the form of the workpiece carrier.

8. The device according to claim 7, wherein the machine tool is designed in the form of a laser cutting machine.

9. A method for creating a reference recording of an unloaded state of a workpiece carrier, the method comprising:
creating a recording of the workpiece carrier with a camera;
determining, using a computer, a loading state of the workpiece carrier by:
evaluating the recording, by executing an algorithm on the computer, to determine bars of the workpiece carrier and whether an object is present on the workpiece carrier;
upon determining that the object is present, determining, by executing the algorithm on the computer, whether the object is below the bars; and
upon determining that the object is below the bars, determining that the object is not on the workpiece carrier; and
upon determining that the workpiece carrier is unloaded based on determining that no object is present on the workpiece carrier, storing the recording in a memory as a reference recording for a next determination of the loading state of the workpiece carrier.

10. The method according to claim 9, wherein the algorithm detects whether an object is only visible between the bars, so that it is below the bars.

11. The method according to claim 9, wherein the algorithm carries out the following method steps in order to determine the bars:
b) creating an edge image from gradients in a first direction and a second direction perpendicular to the first direction;
c) dividing the recording into sectors;
d) calculating an average pixel value within a rectangle shifted in the first direction in the sectors;
e) defining bar segments from maxima that are more than a defined distance from the nearest minimum in the second direction; and
f) defining the bars based upon a predefined portion of the bar elements lying within a range limit.

12. The method according to claim 11, wherein the following method step is carried out before method step b):
a) carrying out histogram equalization.

13. The method according to claim 11, wherein the following method step is carried out after method step f):
g) determining bar removal based upon there being a distance between two bars that exceeds an average distance between the other bars.

* * * * *